Nov. 3, 1942.    O. P. M. GOSS    2,300,728
METHOD OF MANUFACTURING LUMBER
Filed May 29, 1939
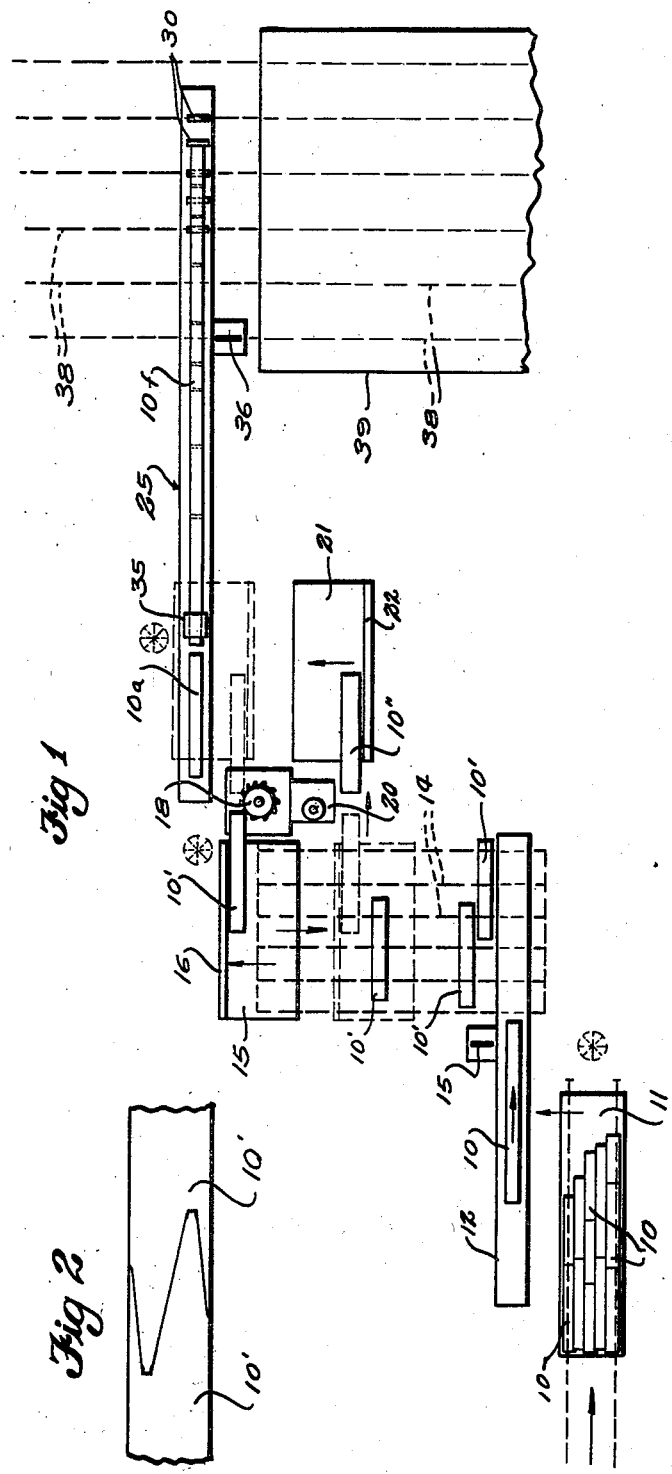
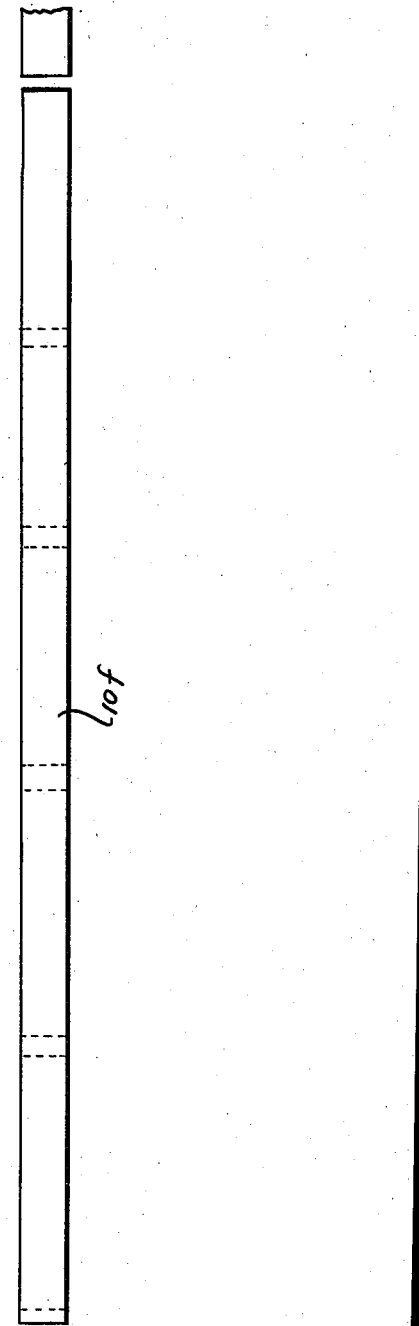
INVENTOR
OLIVER P. M. GOSS
BY Cook & Robinson
ATTORNEYS Patented Nov. 3, 1942

2,300,728

UNITED STATES PATENT OFFICE 2,300,728

METHOD OF MANUFACTURING LUMBER

Oliver P. M. Goss, Seattle, Wash.

Application May 29, 1939, Serial No. 276,399

4 Claims. (Cl. 144—309)

This invention relates to means for and a method of manufacturing lumber, and it has reference more particularly to the manufacture of what is referred to as "fabricated lumber," comprising boards of commercial lumber, of standard dimensions, made by the joining together of board pieces which ordinarily would be disposed of as waste, or which are not considered of such length as to be desirable as commercial lumber.

More specifically, the present invention has reference to the manufacture of lumber of that kind disclosed in the patent of O. P. M. Goss and Worth C. Goss, Patent No. 2,198,245, and of that kind disclosed in the pending application of Worth C. Goss filed on February 11, 1939, under Serial No. 255,946.

Explanatory to the invention, it will be stated that the fabrication of lumber which forms the basis of the above mentioned applications, contemplates processing the opposite ends of the short pieces of boards in such manner that they may be fitted and glued together in substantial and permanent joints. The present, preferred type of joint is that illustrated in the above application of Worth C. Goss, and comprises a series or plurality of interfitted tongues and grooves. The particular design of the tongues and grooves of adjoined pieces provides what is known as a self-pressing joint by reason of the fact that there is produced thereby a predetermined clamping action that is designed to insure the integrity of the joint without requiring that the board be placed between clamps and held during the glue setting period.

It has been the ordinary practice, in the joining of wood pieces, to process the ends of the pieces, then apply a suitable glue to the joint surfaces, then assemble the parts by fitting the tongues of one piece within the grooves of the adjoining piece, and then to seat them tightly together by an application of opposing pressures, applied lengthwise of the pieces, and finally to apply holding clamps to prevent loosening of the joint prior to the setting action of the glue.

In the fabrication of lumber having the self-pressing joints disclosed in the above mentioned application of Worth C. Goss, it has been found that in a joint on which no glue has been spread, the joint closing pressure afforded by reason of the particular design of tongues and grooves, holds the board pieces together in intimate contact even though the joint closing pressure is immediately released. However, when this same joint is closed after being spread with glue, the joint is quite apt to open slightly when closing pressure is immediately removed by reason of the lubricating property of the wet glue and the inherent pressure of the joint. When the glued joint opens in this way, it may be tightly closed again by applying end pressure to the pieces, and if the pressure is immediately released it may open slightly again, but not to the same extent as the first time. If this operation of applying joint closing pressure is repeated several times, all excess glue in the joint will be squeezed out and the hydraulic pressure will be entirely removed, and when this is brought about, the joint will then remain tightly closed without a continuation of the joint closing pressure and the end clamping forces cease to be necessary.

In view of the above, it has been the principal object of this invention to provide an improved method of manufacturing lumber of the above character, which eliminates the possibility of open or loose fitting joints and also eliminates the necessity of the board pieces, after being assembled, being held under joint closing pressure until the joint has completely set.

More specifically stated, the present invention resides in a method of manufacturing "fabricated" commercial lumber from board pieces that have their ends processed for interfitted, glued connection, using tongue and groove or any other type of glued joint, which method brings about the ejection of all excess glue, eliminates the joint slippage that results from the lubricating action of glue and insures a tightly closed and secure joint in its final state; this result being brought about by reason of that step in the method which, after the assembly of adjacent pieces, calls for a plurality of separate applications of pressure applied endwise thereto, and which is incident to board pieces being successively assembled.

Other objects of the invention reside in the various steps of the method and in their sequence; contemplating in particular that board pieces be successively and individually applied to one end of a continuous fabricated board, with a coincident application of joint closing pressure, and that this pressure be resisted throughout the length of the board and transmitted to all the glued joints.

Furthermore, the present invention contemplates the making of a continuous board in the manner above stated, of sufficient length that all joints therein will have been pressed a sufficient number of times that they will retain intimate, tight contact during the glue setting period, and, finally, the cutting from the advanced end of the board, lumber of standard, or commercial lengths, and the drying of this lumber to insure the integrity of the joint by a complete setting of the glue.

In the accompanying drawing, which illustrates one means for carrying out the method embodied by this invention—

Fig. 1 is a plan view showing an arrangement of equipment suitable for carrying out the present method.

Fig. 2 is an edge view of a board illustrating one type of joint employed in the connection of pieces.

Fig. 3 is a plan view of the board, as continuously built up, and from which commercial lengths may be cut at its advanced end.

Referring more in detail to the drawing—

The apparatus here shown may have various arrangements and still be satisfactory for carrying out the present method. However, it is preferred that the parts thereof be arranged as shown, especially when other operations on the lumber not herein disclosed, are to be considered.

In the operation of this apparatus, boards, designated by reference numeral 10, that are defective by reason of knots, pitch pockets, stains, etc., as well as short pieces of boards not desirable as commercial lumber, are conveyed to a starting position by any suitable means, such as on a truck 11. Here an operator is stationed for inspecting the pieces, and those of selected kind are transferred, manually or otherwise, onto a conveyor 12, moving in the direction indicated by the arrow, whereby they are brought into position above a plurality of transversely moving conveyor belts or chains 14.

The operator, in his transfer of the board pieces 10 from the truck 11 to conveyor 12, locates them lengthwise of the conveyor and also notes their defects, if any, and if such defects are of a nature requiring removal, he actuates a trim saw, herein indicated at 15, into position whereby to cut out the defective part of the board. Thus, a single piece of lumber 10 taken from the truck 11 may, after passing the trim saw 15, comprise a plurality of short pieces as here designated by numeral 10'. Each of the board pieces 10', however, would have its ends square cut by reason of the transverse direction of travel of the trim saw, and all pieces, in passing the saw, would remain on the conveyor 12 lengthwise thereof.

The pieces of board 10' are delivered from conveyor 12 onto conveyor chains 14 in position to be deposited thereby lengthwise upon a table 15. This table would be mounted for reciprocal travel, in directions indicated by the arrows thereon, and at one edge this table has a flange 16 against which the pieces could be engaged to square them up with reference to the direction of travel of the table.

With a piece of board disposed against the flange 16 and with its forward end portion extending beyond the edge of the table, the latter is shifted from the full line position to the dotted line position, and by this travel, the forward end of the piece of board is moved against a revolving cutter head 18 of a character whereby the end portion of the board is formed, from edge to edge, with a plurality of tongues and grooves, which may be of that chaarcter shown in Fig. 2. After the end of the board has thus been processed, it is carried against a glue applying means 20 and then the board piece is advanced endwise to another table 21, also mounted for reciprocal travel, as indicated by the arrows thereon, and provided also with a flange 22 against which the board may be placed to square it up with reference to direction of travel of the table. Then, by shifting this table from the full line position shown, to the dotted line position, the rear end portion of the board piece will be passed against the cutter head 18 and likewise formed from edge to edge with tongues and grooves adapted to be interfitted with the tongues and grooves of the forward end of a similarly processed piece of board.

It will here be merely mentioned that in the use of a single cutter-head 18 for operating on both ends of each piece, the top surfaces of the tables would be at different levels, so gauged that in the fitting of the processed ends of board pieces together, their side surfaces will be flush. If different cutter heads should be employed, they could be so adjusted that this different level of tables would not be essential.

From the table 21, the board pieces 10', with both ends processed, are delivered onto an elongated press table 25, and as each piece comes into position thereon, as designated at position 10a, it is advanced endwise along the table, and the forward end of each piece is interfitted with the rearward end portion of the piece next previously received and the fabricated board thus built up and advanced endwise in accordance with the increase in length by reason of the addition of pieces thereto. The fabricated board is here indicated by reference character 10f.

Disposed at spaced intervals along the far end of table 25, are stops 30, adapted to be selectively actuated downwardly or upwardly to position to serve as a stop against which the far end of the elongated board may be abutted. It will be mentioned here that the present method contemplates that this table be forty to sixty feet long in order that the fabricated board will comprise at least five joints between the rear and forward ends thereof.

Assuming that the fabricated board 10f is thus built up in length until its forward end engages the first stop 30, it is then apparent that it may then be held secure against advancement, and that when the next processed piece is added to its rearward end, pressure applied endwise on the last added piece will operate to close the uniting joint. After each piece is thus added to the board, the holding stop 30 is released and the board advanced to position for addition of the next piece to its rearward end, and a selected stop 30 is actuated to position to serve as an abutment whereby to sustain the pressure applied to close the joint. This pressure could be manually applied but it is preferred that it be mechanically applied by use of opposedly arranged gripping clamps, disposed to be brought against the opposite sides of the added piece, then to move forwardly thus to apply pressure to close the joint; such clamps being indicated at 35.

As the board 10f is thus built up by addition of the short pieces, boards of commercial lengths may be cut from its forward end portion, by a swinging trim saw such as designated at 36, and the length of the piece cut off should be so determined that a cut will not pass through a glued joint. After the lumber pieces are cut off from the elongated fabricated board 10f, they are dropped onto a chain conveyor 38 and carried thereby through a drying chamber 39 for final drying of the joint whereby to insure its permanence.

The feature of this invention resides in the fabricating of a board 10f by the successive additions thereto, under endwise pressure, of the individual board pieces 10' in such manner that, with the application of each added piece, an endwise application of joint closing pressure will be exerted throughout the entire length of the fabricated board 10f, that will operate to squeeze from all the joints the excess glue; thus, after a plurality of such applications of pressure, a joint will hold secure by reason of having nullified the lubricating action of the glue and expedited the partial setting of the glue that still remains in the joint so as to overcome the releasing action when pressure is relieved.

While, at the beginning of this specification, a type of self-pressing joint was mentioned, it is not desired that the claims to be appended shall in any way be restricted to this specific type of joint, and it is understood that even in using the ordinary type of tongue and groove joint, or a slightly tapered tongue and groove joint, the result of the lubricating qualities of glue will be apparent, and it will require a plurality of applications of pressure before the joint will hold secure. Thus, it is contemplated that this invention shall apply to lumber utilizing glued joints of any kind that would have the characteristics of the joint described.

It is desired that, regardless of the specific formation of the joint, or the apparatus employed in bringing the parts into assembled relationship, the invention shall be considered to reside in the method of assembling pieces in succession, with an incident application of endwise pressure, and that enough of these pieces be so assembled before the comercial lengths of lumber are taken from the elongated board that the integrity of the finished joint will be insured.

Having thus described my invention, what I claim as new therein and desire to secure by Letters Patent, is:

1. The method of fabricating lumber from board pieces which, at their opposite ends are processed for being joined together by glued joints; comprising applying glue to the joint surfaces of the pieces and individually and successively bringing the pieces into end to end assembly; each piece being assembled with the next preceding one with a coincident momentary application of joint closing pressure which is transmitted to all joints throughout the length of the board comprised by the pieces then assembled.

2. The method of manufacturing fabricated lumber, which comprises processing the ends of board pieces to provide for end to end, interfitting joint connections, applying glue to the joint surfaces and successively assembling the individual board pieces to build up a continuous board, by bringing a processed end of each piece, as added to the board, into joining assembly with the processed end of the next previously applied piece, with a coincident momentary application of joint closing pressure, which is thus momentarily transmitted to all joints throughout the length of the fabricated board.

3. The method of manufacturing fabricated lumber, which comprises processing the ends of board pieces to prepare them for end to end, interfitting joint connections, applying glue to the joint surfaces, and then successively assembling the board pieces to build up a continuous board, by bringing a processed end of each piece, as added to the board, into joining assembly with the processed end of the next previously applied piece, holding the board piece earliest applied while momentarily applying joint closing pressure against each piece as assembled with the others to cause the applied joint closing pressure to be transmitted and momentarily applied to all joints throughout the length of the fabricated board, and cutting lumber of commercial lengths from the farthest advanced portion of the fabricated board beyond a predetermined number of joints therein.

4. The method of manufacturing fabricated lumber, which comprises processing the ends of board pieces to provide for end to end, interfitting joint connections, applying glue to the joint surfaces and successively assembling the board pieces to build up a continuous board, by bringing a processed end of each piece, as added to the board, into joining assembly with the processed end of the next previously applied piece, while holding the earliest applied piece against a stop, momentarily applying joint closing pressure against each piece as it is added to the board, which pressure is momentarily transmitted to all joints throughout the length of the fabricated board, cutting lumber of commercial lengths from the first formed portion of the board beyond a predetermined number of joints and drying the lumber to complete the setting of the glue.

OLIVER P. M. GOSS.